H. T. ANTHONY.
Photographic Plate-Holders.
No. 138,359.  Patented April 29, 1873.
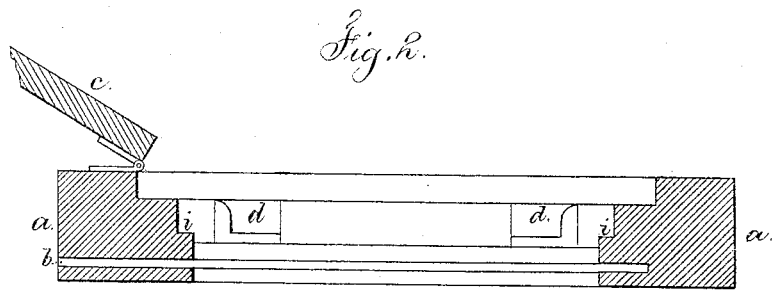
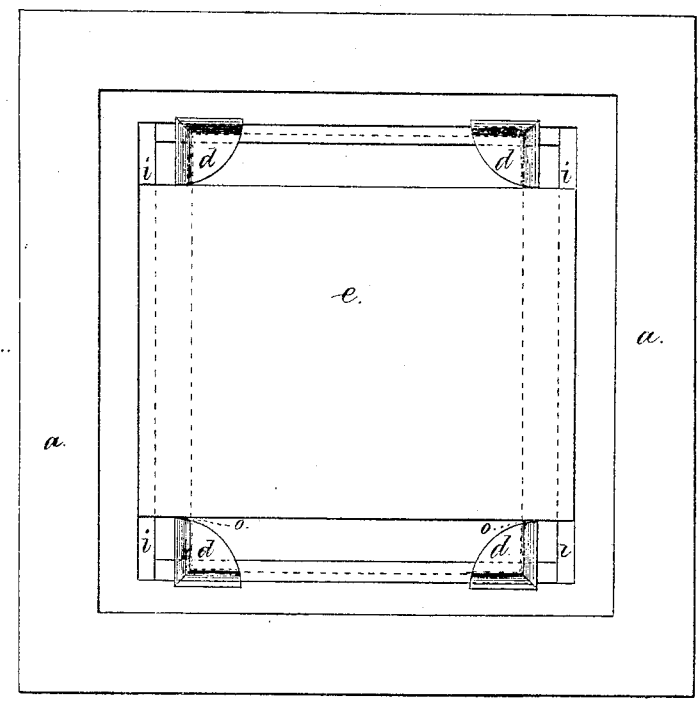

UNITED STATES PATENT OFFICE.

HENRY T. ANTHONY, OF NEW YORK, N. Y.

IMPROVEMENT IN PHOTOGRAPHIC-PLATE HOLDERS.

Specification forming part of Letters Patent No. 138,359, dated April 29, 1873; application filed January 24, 1873.

*To all whom it may concern:*

Be it known that I, HENRY T. ANTHONY, of the city and State of New York, have invented Improvements in Photographic-Plate Frames for Cameras, of which the following is a specification:

This plate-frame is made with vitrefied or other corner pieces to receive the plate in the ordinary position; but the wooden frame is square, or nearly so, and made with ledges in the same plane as the surface of the corners, so that the plate can be changed in its position, and rest upon the ledges of the wooden frame instead of the corners when the plate is inserted in the unusual position.

In the drawing, Figure is an elevation of the frame and corners, and Fig. 2 is a section at the line $x\ x$.

The frame $a$ is made with the slide $b$ and hinged back $c$, as usual. $d\ d$ are vitrefied or other corners introduced in the frame $a$ at the proper distances apart, so that the plate $e$ will be received within said corners in the usual position, with its longest measurement vertically.

The interior of the frame $a$ being square, or nearly so, the glass $e$ can be turned around, and will rest upon the ledges $i\ i$ in the wooden frame when the plate is required to stand with its longest measurement horizontally. The angles $o\ o$ of the corners $d$ serve to prevent the glass slipping down. The ledges $i$, being seldom used, can be easily kept clean, especially when they are varnished with asphaltum or similar varnish. These ledges $i$ are in the same plane as the surface of the glass corners, as seen in Fig. 2, so as not to interfere with the focus of the plate.

I claim as my invention—

The ledges $i\ i$ within the frame $a$ upon the same plane as the surface of the corners $d\ d$, in combination with the said corners $d$, as and for the purposes set forth.

Signed by me this 20th day of January, A. D. 1873.

HENRY T. ANTHONY.

Witnesses:
   GEO. T. PINCKNEY,
   CHAS. H. SMITH.